United States Patent
Kabeya

(10) Patent No.: US 7,778,401 B2
(45) Date of Patent: Aug. 17, 2010

(54) COMMUNICATION APPARATUS

(75) Inventor: Shozo Kabeya, Gamagoori (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1113 days.

(21) Appl. No.: 11/442,982

(22) Filed: May 31, 2006

(65) Prior Publication Data

US 2007/0041543 A1    Feb. 22, 2007

(30) Foreign Application Priority Data

May 31, 2005    (JP)    ............... 2005-160658

(51) Int. Cl.
H04M 1/00 (2006.01)
H04M 3/00 (2006.01)
H04M 9/00 (2006.01)

(52) U.S. Cl. ............... 379/157; 379/93.05; 379/100.01; 379/355.02; 379/399.01

(58) Field of Classification Search ............... 379/93.05, 379/93.09, 93.23, 100.02, 100.03, 100.09, 379/100.14, 100.15, 100.16, 156, 157, 165, 379/166, 350, 352, 355.02, 355.03, 399.01, 379/413.02

See application file for complete search history.

(56) References Cited

U.S. PATENT DOCUMENTS

| | | | | |
|---|---|---|---|---|
| 5,311,573 A | * | 5/1994 | Otsuki | 379/67.1 |
| 5,953,391 A | * | 9/1999 | Kenmochi | 379/77 |
| 5,974,123 A | * | 10/1999 | Nakayama et al. | 379/100.16 |
| 5,991,371 A | * | 11/1999 | Ouchi et al. | 379/90.01 |
| 6,236,468 B1 | * | 5/2001 | Otsuka et al. | 358/444 |
| 6,476,939 B1 | * | 11/2002 | Toyoda et al. | 358/468 |
| 6,498,836 B1 | * | 12/2002 | Kenmochi | 379/100.06 |
| RE39,989 E | * | 1/2008 | Morris | 455/426.1 |
| 2003/0169459 A1 | * | 9/2003 | Chida | 358/400 |
| 2005/0031098 A1 | | 2/2005 | Ito | |
| 2006/0182246 A1 | * | 8/2006 | Horie | 379/188 |
| 2007/0041539 A1 | * | 2/2007 | Asai | 379/142.01 |

FOREIGN PATENT DOCUMENTS

| | | |
|---|---|---|
| JP | 64-39155 | 2/1989 |
| JP | 2005-057659 | 3/2005 |

OTHER PUBLICATIONS

Japanese Office Action, issued in corresponding Japanese Patent Application No. JP 2005-160658, dated on Jul. 11, 2007.

* cited by examiner

*Primary Examiner*—Binh K Tieu
(74) *Attorney, Agent, or Firm*—Baker Botts, LLP.

(57) ABSTRACT

A communication apparatus that includes: an operation unit; a line connection unit that operates in response to the operation of the operation unit; a number input unit; a dial signal transmitting unit that transmits a dial signal corresponding to a telephone number inputted by the number input unit; an operation detection unit that detects the operation of the operation unit; a measuring unit that measures a predetermined time when the operation of the operating unit is detected; and a number memory that stores the telephone number inputted by the number input unit before the measuring of the predetermined time by the measuring unit ends. A standby unit suspends a transmission of the dial signal corresponding to the telephone number stored in the number memory to the line until the measuring of the predetermined time by the measuring unit ends.

8 Claims, 6 Drawing Sheets

US 7,778,401 B2

COMMUNICATION APPARATUS

CROSS REFERENCE TO RELATED APPLICATION

This application claims priority from Japanese Patent Application No. 2005-160658, filed on May 31, 2005, the entire subject matter of which is incorporated herein by reference.

TECHNICAL FIELD

Aspects of the present invention relate to a communication apparatus for performing a communication with a called apparatus through a repeating installation and particularly to a communication apparatus capable of appropriately establishing a communication state with the called apparatus.

BACKGROUND

A communication apparatus, including a facsimile apparatus and a telephone set, establishes a direct current (DC) loop by a relay. The relay is operated by, for example, providing a transmitting/receiving device in an off-hook state or a pressing a speakerphone key, which are performed by an operator.

In order to reduce the size of a communication apparatus such as a facsimile apparatus or a telephone set, a semiconductor data access arrangement (DAA) has been used in an interface (I/F) between the communication apparatus and a telephone line. The DAA performs a line connect operation instead of a relay. Therefore, in a communication apparatus having the DAA, when the transmitting/receiving device is provided at an off-hook state or the speakerphone key is pressed, the DAA starts to make a DC loop and establishes the DC loop. When a call signal is transmitted from the communication apparatus to a repeating installation, the repeating installation transmits a dial tone to the communication apparatus in response to the call signal. When a telephone number designating a called apparatus is inputted by an operator of the communication apparatus, dial signals corresponding to digits of the telephone number are transmitted to the repeating installation through the established line.

When the dial signals transmitted from the communication apparatus are received by the repeating installation, the transmission of the dial tone in the repeating installation is stopped. Simultaneously, a called apparatus corresponding to the telephone number is called by the repeating installation or another repeating installation. When the called apparatus responds to the call from the repeating installation, a communication state is established between the calling side communication apparatus and the called side communication apparatus.

The DAA of the communication apparatus includes a voltage detection circuit. A voltage of the established telephone line is detected by the voltage detection circuit, and a control for regulating the detected voltage is performed such that a preliminarily determined voltage-current characteristics is obtained. Specifically, when the off-hook or a pressing of the speakerphone key is detected, the DAA regulates current on the basis of the voltage detected by the voltage detection circuit to match impedance on the communication apparatus side to impedance (for example, 600Ω) of the telephone line. Therefore, the line is terminated with the matched impedance, so that the communication apparatus can perform good data communication through the telephone line (see JP-A-2005-57659).

SUMMARY

However, the impedance matching, which is executed by the DAA in establishing the line, is made by regulating current repeatedly while monitoring the voltage value by the voltage detection circuit, such that the impedance finally converges to an aimed value. Therefore, compared with a case where the DC loop is made by a relay, a time required from the providing of the off-hook state (or the pressing the speakerphone key), which is requested to make the telephone line loop, to the establishment of the line loop becomes long. As a result, when an operator starts an input of the telephone number immediately after the providing of the off-hook state (or pressing the speakerphone key), the telephone number is inputted before the telephone line loop is made. The dial signals corresponding to the inputted telephone number before the telephone line loop is made cannot be received by the repeating installation, resulting in dropping of some digits of the telephone number (the dial signals corresponding to the telephone number). Therefore, there is a problem that it is impossible to establish a communication between the calling device and the called apparatus corresponding to the telephone number inputted by the operation of the calling device.

Further, there may be a case where, after providing the off-hook state or pressing the speakerphone key, an operator starts an input of a telephone number without confirming a dial tone. Incidentally, the dial tone is a signal, which is transmitted when it becomes possible for the repeating installation to receive the dial signals. Therefore, generally the repeating installation cannot receive the dial signals transmitted from a communication apparatus before the communication apparatus receives the dial tone from the repeating installation. On the other hand, in a repeating installation, there is a tendency that a time period from a reception of a call signal from a calling communication apparatus to a transmission of a dial tone to the calling communication apparatus becomes longer. That is, there is a tendency that a time lag from a time when an operator performs a communication request operation (such as providing an off-hook state) for connecting the line to a time when the dial tone is received (until the called repeating installation becomes possible to receive the dial signals) becomes longer. Therefore, there is another problem that possibility of transmission of the dial signals made within the time lag is higher, and the possibility of dropping of dial signals corresponding to a telephone number becomes higher.

Aspects of the present invention provide a communication apparatus capable of establishing an accurate communication state between a calling side and a called side without dropping of dial signals of a telephone number.

According to an aspect of the invention, there is provided a communication apparatus including: an operation unit for connecting a line by an operation of an operator; a line connection unit that calls a repeating installation provided on a line by connecting the line in response to the operation of the operation unit; a number input unit for inputting a telephone number designating a called apparatus according to an operation of the operator; a dial signal transmitting unit that transmits a dial signal corresponding to the telephone number inputted by the number input unit to the line connected by the line connection unit; an operation detection unit that detects the operation of the operation unit; a measuring unit that measures a predetermined time when the operation of the operating unit is detected by the operation detection unit; and a number memory that stores the telephone number inputted by the number input unit before the measuring of the predetermined time by the measuring unit ends, wherein the dial signal transmitting unit comprises a standby unit that suspends a transmission of the dial signal corresponding to the telephone number stored in the number memory to the line until the measuring of the predetermined time by the measuring unit ends, and the dial signal transmitting unit transmits the dial signal corresponding to the telephone number and stored in the number memory to the line after a standby operation by the standby unit.

In the communication apparatus according to the aspect of the present invention, the predetermined time is measured by the measuring unit when the operation of the operation unit is detected by the operation detection unit. The telephone number inputted by the number input unit before the end of the measuring of the predetermined time is stored in the number storing unit. The transmission of the dial signals corresponding to the number stored in the number memory unit to the telephone line by means of the dial signal transmission unit is held by the standby unit until the measuring of the predetermined time ends. When the standby operation of the standby unit ends, that is, after the measuring of the predetermined time ends, the dial signals corresponding to the number stored in the number memory unit are transmitted to the telephone line by the dial signal transmission unit.

Therefore, until the predetermined time from the time when the operation of the operation unit is detected lapses, the transmitting operation of the dial signal transmission unit for transmitting the dial signals corresponding to the input number to the telephone line is not executed immediately even when the number is inputted by the number input unit. When the operator operates the number input unit immediately after the operation of the operation unit, the timing of the number input may be before the telephone line is made by the line connection unit or before the repeating installation becomes possible to receive the information from the communication apparatus. In such case, if the dial signal transmission unit is forced to execute the transmission operation for transmitting the dial signals corresponding to the input number to the line immediately, the dial signals can not be received by the repeating installation, because the repeating installation can not receive the dial signals.

However, since it is possible to hold the telephone number inputted by the number input unit in the number memory unit until the predetermined time from the operation of the operation portion lapses and to transmit the number to the telephone line by the dial signal transmission unit after the measuring of the predetermined time ends, the repeating installation can surely receive the dial signals corresponding to the inputted number without dropping of digits thereof. Therefore, even when the number is inputted before the line loop is connected by the line connection unit or before the information from the communication apparatus can be received by the repeating installation, dropping of significant digits of the input number can be avoided and it is possible to call the called apparatus corresponding to the number inputted by the operator, exactly.

DETAILED DESCRIPTION

Aspects of the present invention will be described with reference to the drawings.

Figure 1A:
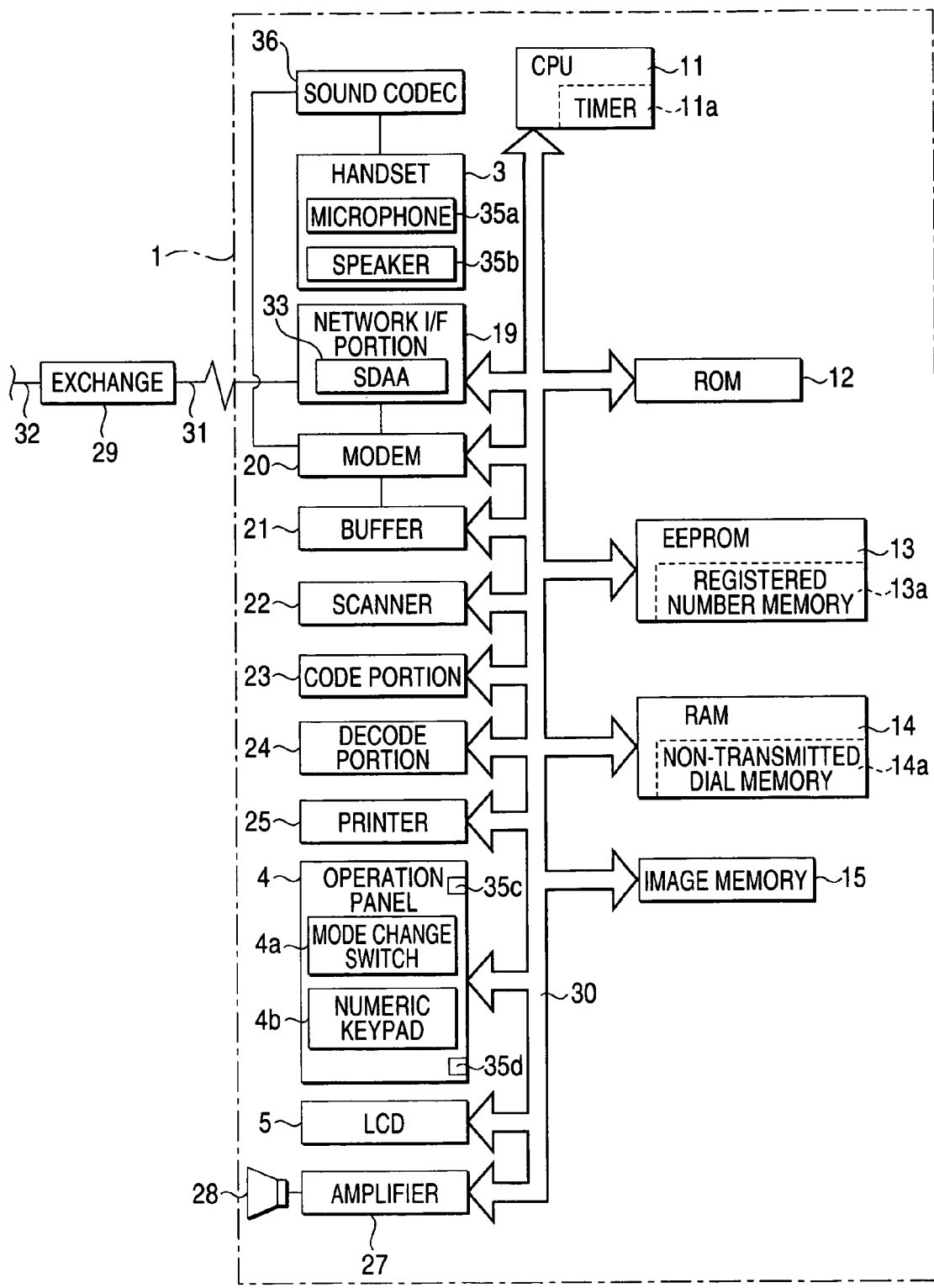
FIG. 1A is a block diagram showing an overview of a facsimile apparatus according to a first aspect of the present invention and FIG. 1B is a partial block diagram.

FIG. 1A is a block diagram showing an electrical construction of a facsimile apparatus 1. The facsimile apparatus 1 is provided with a CPU 11, a ROM 12, an EEPROM 13, a RAM 14, an image memory 15, a network I/F portion 19, a MODEM 20, a buffer 21, a sound CODEC 36, a scanner 22, a code portion 23, a decode portion 24, a printer 25, a handset 3, an operation panel 4, a liquid crystal display (LCD) 5 and an amplifier 27. These components are mutually connected by a connection line 30 formed by a bus line or a cable.

The network I/F portion 19 performs a control of the telephone line and includes a silicon DAA (hereinafter referred to as SDAA) 33. The SDAA 33 performs a connecting (making) operation and an opening (disconnecting) operation of the telephone line and includes a voltage detector circuit. A voltage detected by the voltage detector circuit is outputted from the SDAA 33 to the CPU 11 through the MODEM 20. The SDAA 33 controls a voltage of the established line, which is detected by the voltage detector circuit, such that a predetermined voltage-current characteristics is obtained. Specifically, in the SDAA 33, when a connecting (making) of the telephone line is requested by an operation of an operator, a current is regulated on the basis of the voltage detected by the voltage detector circuit to match an impedance on the side of the facsimile apparatus 1 with an impedance (for example, 600Ω) on the telephone line 31. Thus, the telephone line itself is terminated with matched impedance and the facsimile apparatus 1 can perform a high quality data (signal) communication through the telephone line. By using the SDAA 33 instead of the conventional relay as a device for performing the connecting and opening operations of the telephone line, it is possible to downsize the facsimile apparatus 1.

The facsimile apparatus 1 is connected to the telephone line 31 through the network I/F portion 19. The network I/F portion 19 receives various signals such as a call signal (ringing signal) from an exchange 29 and a signal indicating a telephone number (caller number) of a called side apparatus. Also, the network I/F portion 19 transmits dial signals corresponding to an operation of keys on the operation panel 4 to the exchange 29. An analog sound signal is digitized by the SDAA 33 of the network I/F portion 19. The signal is inputted to the sound CODEC 36 through the MODEM 20 and converted into an analog voice signal by the sound CODEC 36. The handset 3 is connected to the sound CODEC 36.

The handset 3 is a transmitter-receiver including a microphone 35a as a transmitter and a speaker 35b as a receiver. The handset 3 is set on a hook (not shown). During communication, the handset 3 is picked up from the hook. A state where the handset 3 is put on the hook is referred to as an on-hook state. A state where the handset 3 is picked up from the hook is referred to as an off-hook state. When the handset 3 is in an off-hook state, a hook switch 35c is turned on. When the hook switch 35c is turned on, the SDAA 33 starts to connect the telephone line. That is, the off-hook of the handset 3 caused by the operation of the operator is an operation for the line connection (request for making the telephone line).

Incidentally, the facsimile apparatus 1 has a speakerphone function for performing communication in the off-hook state of the handset 3 and includes a speakerphone key 35d for executing the speakerphone function. When the speakerphone key 35d is pushed, a speakerphone communication switch is turned on. In response to the turning on of the speakerphone communication switch, a signal requesting a making of the telephone line is inputted to the SDAA 33 and a line connect operation of the SDAA 33 is started. That is, in the facsimile apparatus 1, the line connect operation (line making request) is started when the operator provides the off-hook state of the handset 3 or pushes the speakerphone key 35d. The hook and the speakerphone key 35d function as an operation unit.

The CPU 11 controls the respective portions connected by the connection line 30 according to various signals transmitted/received through the network I/F portion 19 and executes the facsimile operation including the data communication and the telephone operation (voice communication). A timer 11a for measuring a predetermined time is provided in the CPU 11. The CPU 11 always monitors the states of the hook switch 35c and the speaker phone communication switch. When the turning off of the hook switch 35c (that is, the off-hook state of the handset 3) or the speakerphone communication switch (that is, pressing of the speakerphone key 35d) is detected by the CPU 11, the timer 11a is actuated to execute the measurement of the predetermined time. The predetermined time to be measured by the timer 11a is a sum of a time required for connecting the telephone line by the SDAA 33 and a assurance time for transmitting the dial tone by the exchange 29 in response to a calling signal received (that is, a time from the time when the exchange 29 receives the calling signal to the time when the exchange 29 can receive the dial signal). In this aspect, the predetermined time is 3 seconds.

The facsimile apparatus 1 is constructed such that, even when a dial input is performed during the timer 11a measures the predetermined time (3 seconds), that is, for a certain time after the line connection is requested, a transmission of the dial signals (a DTMF signal or a dial pulse signal) corresponding to the inputted dials to the telephone line 31 is suspended.

Figure 2:
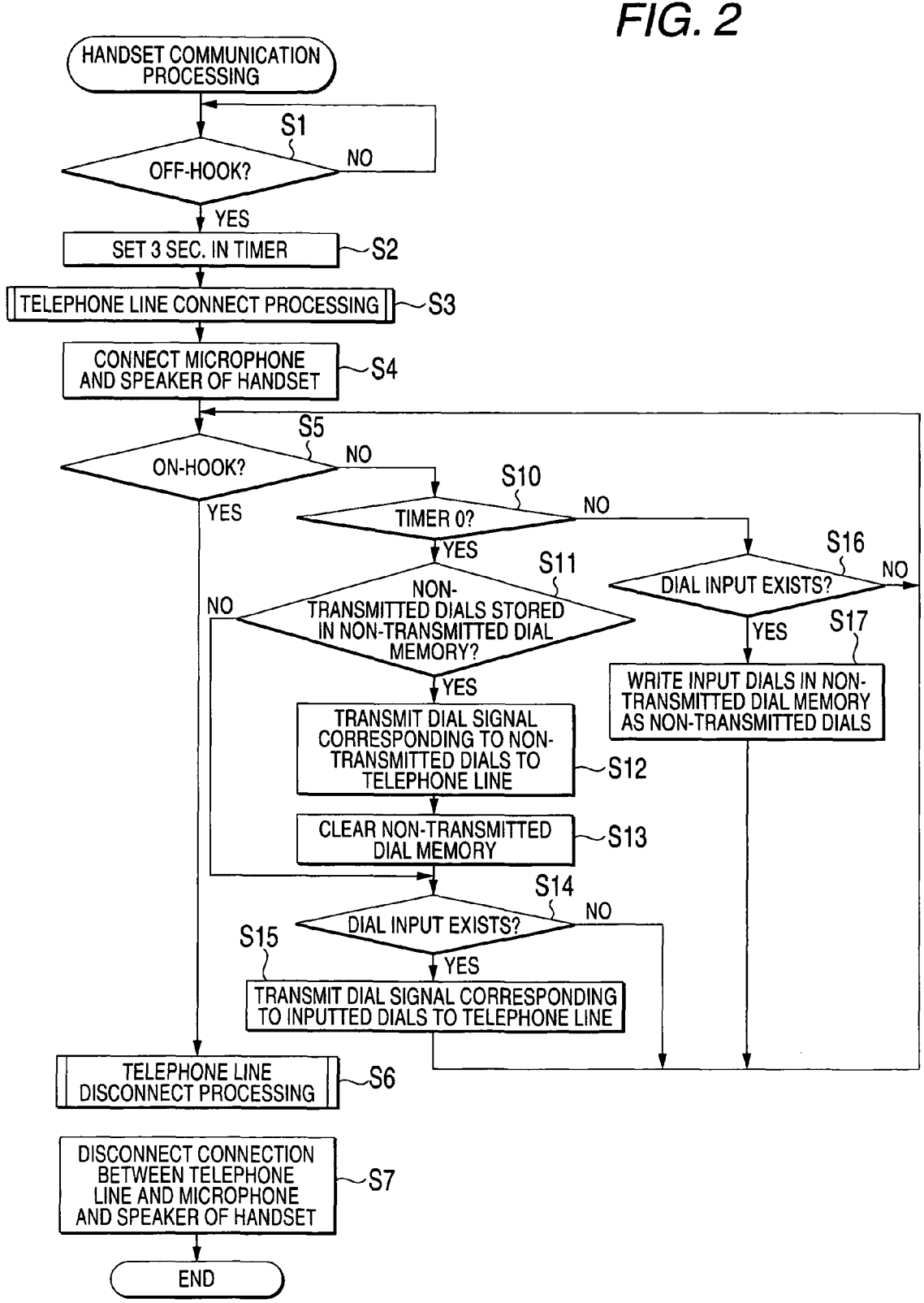
FIG. 2 is a flowchart of a handset communication processing executed by the facsimile apparatus.

The ROM 12 stores control programs to be executed in the facsimile apparatus 1 and fixed values. A program shown by a flowchart in FIG. 2 is stored in the ROM 12.

The RAM 14 stores various data temporarily when the operations of the facsimile apparatus 1 are executed. The RAM 14 includes a non-transmitted dial memory 14a. The non-transmitted dial memory 14a stores a dial, which is inputted during the measuring by the timer 11a and is not transmitted to the telephone line 31 yet. As mentioned above, in the facsimile apparatus 1, when the dial is inputted during the measuring of the predetermined time (3 seconds) by the timer 11a, the dial signals corresponding to the dial is not transmitted to the telephone line 31. The dial inputted during the measuring is stored in the non-transmitted dial memory 14a until the measuring of the predetermined time (3 seconds) by the timer 11a ends. The non-transmitted dial stored in the non-transmitted dial memory 14a is read out from the non-transmitted dial memory 14a after the predetermined time (3 seconds) lapses, and the dial signals corresponding to the dial is transmitted to the telephone line 31. The non-transmitted dial in the non-transmitted dial memory 14a is erased after the dial signals are transmitted.

Incidentally, the dial is inputted by pushing keys of a numeric keypad 4b provided on the operation panel 4, which constitute a telephone number of a called apparatus, or by designating a telephone number stored in a registered number memory 13a, which is to be described later, by operating a predetermined key on the operation panel 4, by the operator. When the dial input during the measuring operation by the timer 11a is made according to the former method, numbers dialed sequentially are written in the non-transmitted dial memory 14a in the same sequence. When the dial input during the measuring operation by the timer 11a is made according to the latter method, numbers constituting the designated telephone number are written in the non-transmitted dial memory 14a simultaneously.

The EEPROM 13 is a non-volatile rewritable memory and includes a registered number memory 13a. The registered number memory 13a stores a plurality of telephone numbers inputted by a predetermined operation (registering operation) of the operation panel 4. Each telephone number is stored with a representative number. When one of the representative numbers is designated by the predetermined operation (designating operation) of the operation panel 4, the telephone number corresponding to the representative number is designated and the CPU 11 recognizes it as a dial input of the designated telephone number. When such designation of the telephone number is executed during the measuring operation by the timer 11a, the designated telephone number (inputted dial) is written in the non-transmitted dial memory 14a as mentioned previously. On the other hand, when such designation of the telephone number is executed after the measuring operation by the timer 11a, dial signals corresponding to dials constituting the designated telephone number are transmitted to the telephone line 31 immediately.

The image memory 15 stores bit images for communication history, image data and printing. The image memory 15 is constructed with dynamic RAM (DRAM), which has a large capacity and is inexpensive. Received image data is temporarily stored in the image memory 15 and erased after it is printed on a recording sheet by the printer 25. Image data read out by the scanner 22 is also stored in the image memory 15.

The MODEM 20 transmits image information and communication data by modulating and demodulating them and transmits/receives various process signals for transmission control. The buffer 21 temporarily stores data including coded image information transmitted/received between the calling side and the called side.

Figure 1B:
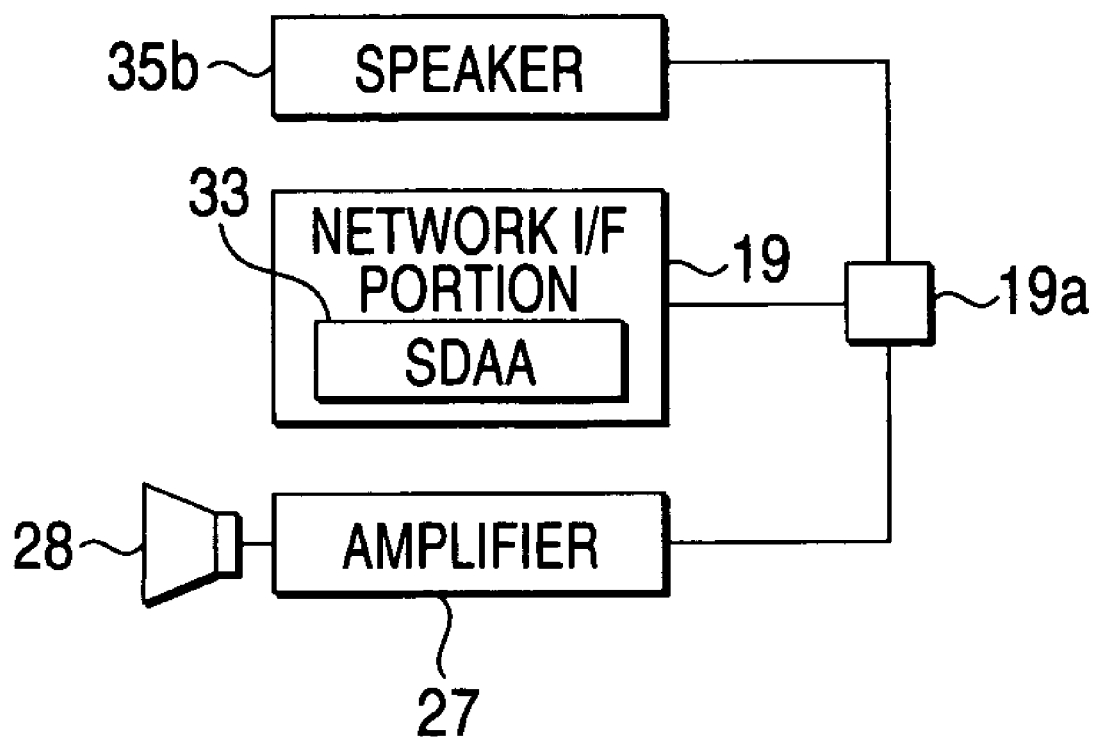

As shown in FIG. 1B, a mute circuit 19a is provided between the network I/F portion 19 and a speaker 28 (amplifier 27) and between the network I/F portion 19 and the speaker 35b of the handset 3. The various signals (dial tone, busy tone, ring-back tone, dial signal, cut signal, etc.) received from/transmitted to the telephone line 31 and a sound signal (utterance) from the called apparatus is outputted by either the speaker 28 (amplifier 27) or the speaker 35b through the mute circuit. Incidentally, the mute circuit functions as a level setting unit.

The mute circuit is controlled by the CPU 11 to attenuate the signal level to be outputted to the speaker 28 or the speaker 35b to zero level or a low level at which the signal sound can not be heard, that is, the mute level, to thereby mute the signal sound. The mute function of the mute circuit can be turned on and off. When the mute function is set on, the level of the inputted signal is converted into the zero or low level, so that the signal sound from the speaker 28 or 35b is muted (receiving sound mute). When the mute function is set off, the level of the inputted signal is outputted from the speaker 28 or 35b as it is.

Incidentally, the term "mute" means that sound volume is in a range in which the operator in a usual state cannot hear the signal sound. Therefore, the mute is a concept containing not only the state in which signal is completely silent but also the state in which a signal having a low level is outputted.

The mute circuit may be constructed such that, by turning the mute function on, the mute circuit attenuates the signal sound from the speaker 28 or 35b such that the sound volume of the signal sound is attenuated to a level at which the signal sound can hear, that is, the output level is changed to a level lower than the input level.

It is possible to construct the mute circuit such that a plurality of attenuation levels of the inputted signal can be set. Instead of the above mentioned mute circuit, as a device in which the signal sound is cut, a sound volume controller for changing signal level may be provided. Alternatively, a device in which the signal sound from the speaker 28 or 35b is cut by cutting connection between the speaker 28 or 35b and the transmission line (telephone line 31) of the signal due to an operation of a switch may be provided. The switch connects the transmission line and the speaker 28 or 35b such that the connection can be shut off.

The operation panel 4 includes a mode switch 4a, the numeric keypad 4b and command keys. The mode switch 4a switches the operation between a DTMF mode in which the dial signals are transmitted by a DTMF signal and a DP mode in which the dial signals are transmitted by the dial pulse signal. The numeric keypad 4b includes keys for inputting numerals 0 to 9 individually for the dial input and for inputting the telephone number to be stored in the registered number memory 13a.

The command keys are for inputting various commands. The command keys include, for example, a registration request key for requesting a registration of a telephone number in the registered number memory 13a, the speakerphone key 35d for performing the speakerphone function and a start key for reserving transmission of image data to a called apparatus.

In the facsimile apparatus 1, the operation states, the operation processes, error messages and existence of non-printed data, etc., are displayed on the LCD 5 when the various operations are executed by pushing the keys and the switches provided on the operation panel 4.

The scanner 22 reads an original inserted into an original insertion slot as an image data. The scanner 22 includes a motor for transporting the original. The code portion 23 codes the image data read out by the scanner 22. The decode portion 24 reads the image data stored in the buffer 21 or the image memory 15 and decodes the image data. The decoded data is printed on a recording sheet by the printer 25. The printer 25 is an ink-jet type printer including a recording sheet feeding motor, a carriage motor for moving a carriage and a printing head mounted on the carriage for ejecting ink onto the recording sheet. The amplifier 27 drives the speaker 28 connected to the amplifier 27 to output a call sound and voice.

The facsimile apparatus 1 constructed as mentioned above is connected to the telephone line 31 through the network I/F portion 19. The telephone line 31 is connected to the exchange 29, which is connected to other repeating installations through the telephone line 32. Incidentally, the other repeating installations are connected to the called apparatus and other devices through the telephone lines.

Now, the handset communication processing executed by the facsimile apparatus 1 will be described with reference to a flowchart shown in FIG. 2. The handset communication processing shown in FIG. 2 is repeatedly read out from the ROM 12 during a power switch of the facsimile apparatus 1 is turned on and executed by the CPU 11. The handset communication processing is to perform a communication between a called apparatus side and the operator with using the handset 3. Further, the handset communication processing is constructed such that the standby operation of the transmission of the dial signal to the telephone line 31 is executed when a dial is inputted by the operator within a predetermined time from a time when the operator performs the off-hook of the handset 3.

In the handset processing, it is confirmed whether or not the handset 3 is in an off-hook state (S1). The off-hook state of the handset 3 is detected by turning on of the hook switch 35c as mentioned previously. When the handset 3 is not in an off-hook state (the hook switch 35c is OFF) (S1:No), the facsimile apparatus 1 waits for an off-hook state. On the other hand, when the handset 3 is in an off-hook state (the hook switch 35c is ON) (S1:Yes), the timer 11a is set to 3 seconds and starts measuring 3 seconds (S2).

Then, a line connect processing for connecting the telephone line 31 is executed (S3). Specifically, in the line connect processing (S3), the DC loop (telephone line 31) is made by regulating a current in the SDAA 33 on the basis of a voltage detected by the voltage detection circuit of the SDAA 33 and matching the impedance on the side of the facsimile apparatus 1 with the impedance (for example, 600Ω) of the telephone line. After the line connect processing (S3), the microphone 35a and the speaker 35b of the handset 3 are connected to the telephone line 31 (S4). Therefore, the signal received by the facsimile apparatus 1 through the telephone line 31 and the signal transmitted from the facsimile apparatus 1 to the telephone line 31 are outputted from the speaker 35b. Also, the line condition, etc., are monitored by the outputted sound.

Thereafter, it is confirmed whether or not the handset 3 is the on-hook state (S5). When the handset 3 is not in the on-hook state (S5:No), it is determined that the operation requests a continuation of the communication and it is confirmed whether or not the timer 11a is 0 (S10).

When the timer 11a is not 0 (S10:No), the timer 11a is measuring 3 seconds, which is the standby period for suspending the transmission of the dial signal. Therefore, it is confirmed whether or not there is the dial input (S16). When there is the dial input (S16:Yes), the inputted dial is written in the non-transmitted dial memory 14a as a non-transmitted dial (S17) and the processing returns to the step S5. On the other hand, when there is not the dial input (S16:No), the processing returns to the step S5. Thus, the processing in the S5, S10, S16 and S17 is repeatedly executed until the measuring by the timer 11a ends and the steps S11 to S15 is suspended. Therefore, the processing in the steps S12 and S15 for transmitting the dial signal corresponding to the inputted dial to the telephone line 31 is evaded. That is, the inputted dial is held in the non-transmitted dial memory 14a, and the dial signals corresponding thereto is not transmitted to the telephone line 31.

Incidentally, when the dial input is executed by designating the telephone number stored in the registered number memory 13a, all of the dial signals constructing the designated telephone number are input at once. Therefore, in the step S17, all of the dial signals constructing the designated telephone number are written in the non-transmitted dial memory 14a as non-transmitted dial signals.

On the other hand, when the timer 11a is 0 (S10:Yes), the period (3 seconds from the detection of the off-hook state) in which the transmission of the dial signal is suspended ends. Therefore, it is confirmed whether or not the non-transmitted dial signals are stored in the non-transmitted dial memory 14a (S11). When there is no non-transmitted dial signal in the non-transmitted dial memory 14a (S11:No), the processing is shifts S14 by skipping the steps S12 and S13.

When there is the non-transmitted dial in the non-transmitted dial memory 14a (S11:Yes), the dial signals corresponding to the non-transmitted dial are transmitted to the telephone line 31 as DTMF signal or the dial pulse signal according to the mode set by the mode switch 4a (S12). Then, the content of the non-transmitted dial memory 14a is cleared (S13), and it is confirmed whether or not the dial input is made (S14). When there is the dial input (S14:Yes), the dial signals corresponding to the inputted dial are transmitted to the telephone line 31 as DTMF signal or the dial pulse signal according to the mode set by the mode switch 4a (S15). Therefore, after the measuring of the predetermined time by the timer 11a ends (after the time period for which the transmission of the dial signal is suspended ends), the dial signals corresponding to the dial input are immediately transmitted to the telephone line 31. Therefore, it is possible to reduce the time for the whole transmission of the dial signals without execution of the unnecessary standby operation. Further, when there is no dial input (S14:No), the processing is shifted to the step S5. After the measuring by the timer 11a ends, the processing in the steps S5, S10 to S15 is repeated until the on-hook of the handset 3 occurs.

When, in the step S5, the handset 3 is in the on-hook state (S5:Yes), the line disconnect processing is executed (S6), and the telephone line is broken by the operation of the SDAA 33. Thereafter, the connection between the microphone 35a and the speaker 35b of the handset 3 and the telephone line 31 is cut (S7), and the handset communication processing ends.

Figure 3:
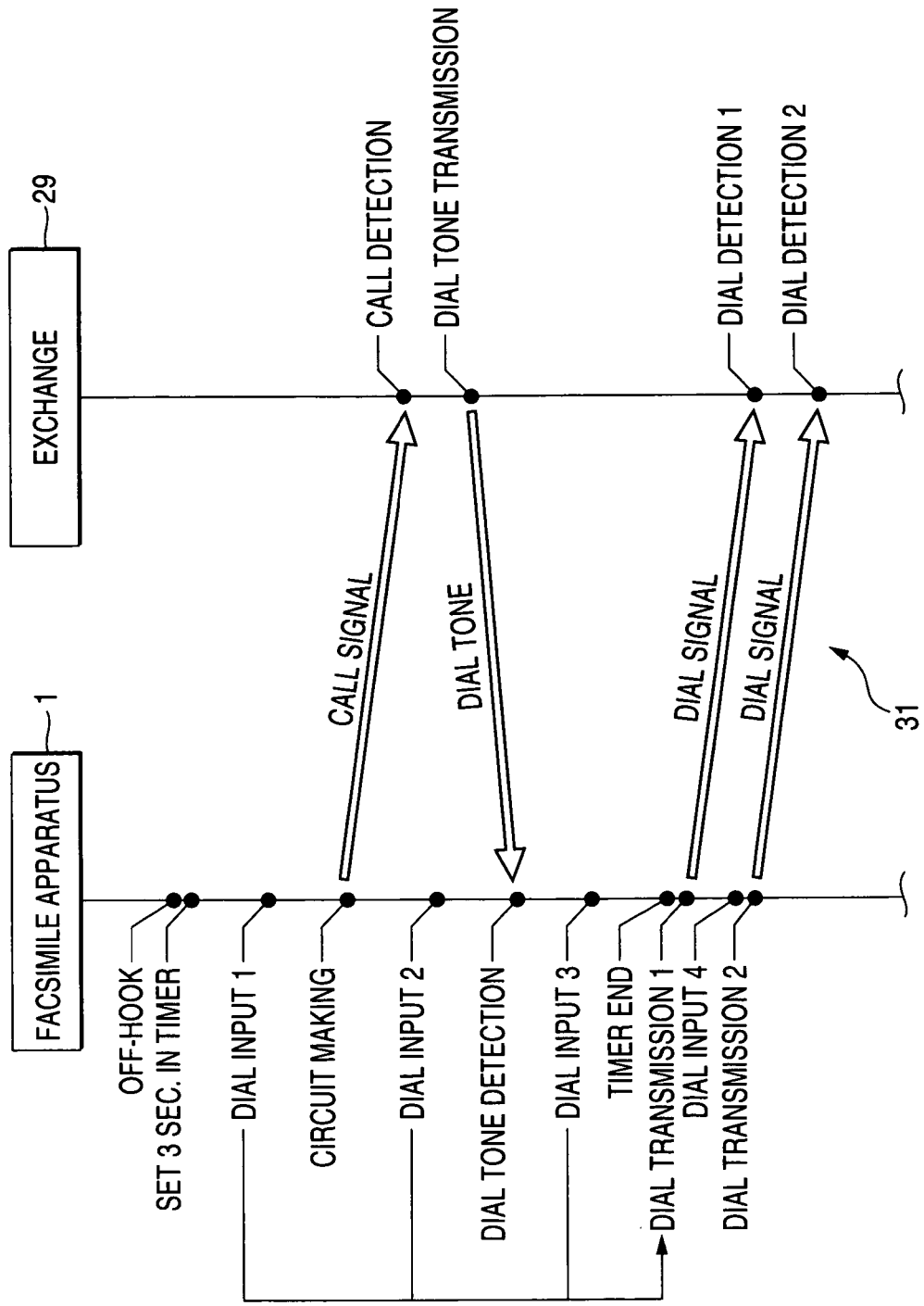
FIG. 3 is a timing chart showing transmission/reception timings of various signals between the facsimile apparatus and an exchange.

FIG. 3 is a flowchart showing transmitting/receiving timings of the communication of various signals between the facsimile apparatus 1 and the exchange 29 in executing the handset communication processing shown in FIG. 2. Two vertical lines are time axes, a left side line of which shows the operations in the facsimile apparatus 1 in time series and a right side line of which shows the operations in the exchange 29 in time series. Timings of the respective operations performed in the facsimile apparatus 1 and the exchange 29 are indicated by black points on the time axes.

When the off-hook of the handset 3 occurs in the facsimile apparatus 1 as shown in FIG. 3, the timer 11a is set to 3 seconds ("timer set of 3 seconds"). The ON switching of the hook switch 35c due to the off-hook of the handset 3 is detected by the CPU 11 as the request of line connect, and the line connect operation is started in the SDAA 33. A time required from the start to the end of the line connect operation in the SDAA 33 provided in the facsimile apparatus 1 is about 1 to 2 seconds. Therefore, the telephone line is made ("DC loop made") after this time period, and a call signal is transmitted to the exchange 29 ("line made"). Thus, the communication between the facsimile apparatus 1 and the exchange 29 is started.

On the other hand, the reception of the calling signal ("DC loop making") is always monitored in the exchange 29. When a call signal is detected ("calling detection"), a preparation for receiving dial signals from the facsimile apparatus 1 is started. When the receiving of the dial signals from the facsimile apparatus 1 becomes possible by completing the preparation, a dial tone is transmitted from the exchange 29 ("dial tone transmission").

When the reception of the dial tone is detected in the facsimile apparatus 1 ("dial tone detection"), a signal sound (continuous sound with predetermined pitch) of the dial tone is outputted from the speaker 35b of the handset 3. As mentioned, in the facsimile apparatus 1, the predetermined time to be set in the timer 11a is the sum of the time required by the SDAA 33 for making the telephone line and the guarantee time for transmitting the dial tone from the exchange 29, which received the call signal. Therefore, the dial tone is received before the measuring by the timer 11a ends.

In the facsimile apparatus 1, the dial input is allowed immediately after the off-hook state ends. Thus, there is a case where the operator executes the dial input without waiting for the reception of the dial tone ("dial input 1", "dial input 2"). Since the "dial input 1" is before the telephone line is made, the dial signals are not received on the side of the exchange 29. The "dial input 2" is after the telephone line is made. However, the dial signals are not received on the side of the exchange 29 since the preparation for receiving the dial signal on the side of the exchange 29 is not completed. In the facsimile apparatus 1, when the dial input is performed before the measuring of 3 seconds by the timer 11a ends ("dial input 1", "dial input 2", "dial input 3"), the dial signals are not transmitted to the telephone line 31 at the inputted timing.

Thereafter, when the measuring operation by the timer 11a ends, that is, the measuring of 3 seconds ends ("timer end"), in the facsimile apparatus 1, the dial signal corresponding to the inputted dial is transmitted to the telephone line 31 ("dial transmission 1"). When a dial is inputted after the measuring by the timer 11a ends ("dial input 4"), the corresponding dial signals are transmitted to the telephone line 31 immediately ("dial transmission 2").

In the exchange 29, the dial signal transmission becomes possible after the dial tone is transmitted. Therefore, the dial signals from the facsimile apparatus 1 are received by the exchange 29 correctly. When the exchange 29 receives an initial dial signal from the facsimile apparatus 1 ("dial detection 1"), the transmission of the dial tone stops. Dial signals transmitted from the facsimile apparatus 1 thereafter are received by the exchange 29 sequentially ("dial detection 2").

Incidentally, the transmission/reception of various signals is executed with similar timings by, not only the off-hook, but also the pressing of the speakerphone key 35d. When the dial input is executed by designating a telephone number stored in the registered number memory 13a, all dial signals constituting one telephone number are inputted at once. Therefore, the dial input and the dial signal transmission are performed only once in the facsimile apparatus 1, and the dial detection is performed only once in the exchange 29.

According to the facsimile apparatus 1 of this aspect, the exchange 29 can receive dial signals corresponding to inputted dial reliably even when the operator executes the dial input before the dial tone is received. Therefore, it is possible to perform a communication between the facsimile apparatus 1 and an aimed called apparatus without dropping digits of the telephone number inputted by the operator.

Now, a second aspect of the present invention will be described with reference to FIGS. 4 and 5. The first aspect of the facsimile apparatus is constructed such that the transmission of dial signals corresponding to the inputted dial to the telephone line 31 is suspended for the predetermined time period from the execution of the off-hook of the handset 3 or the pressing of the speakerphone key 35d (request of line connect) by the operator of the facsimile apparatus 1 even when the dial input is executed. In the second aspect, the facsimile apparatus 1 is constructed similarly to the first aspect and, in addition thereto, is constructed such that the dial tone transmitted from the exchange 29 is muted when the dial input is executed within the predetermined time (the measuring operation by the timer 11a) from the execution of the off-hook state of the handset 3 or the pressing of the speakerphone key 35d (request of line connect) by the operator.

Incidentally, portions, which are identical to those of the first aspect, are depicted by the same reference numerals without detailed description thereof and only different portions will be described.

Figure 4:
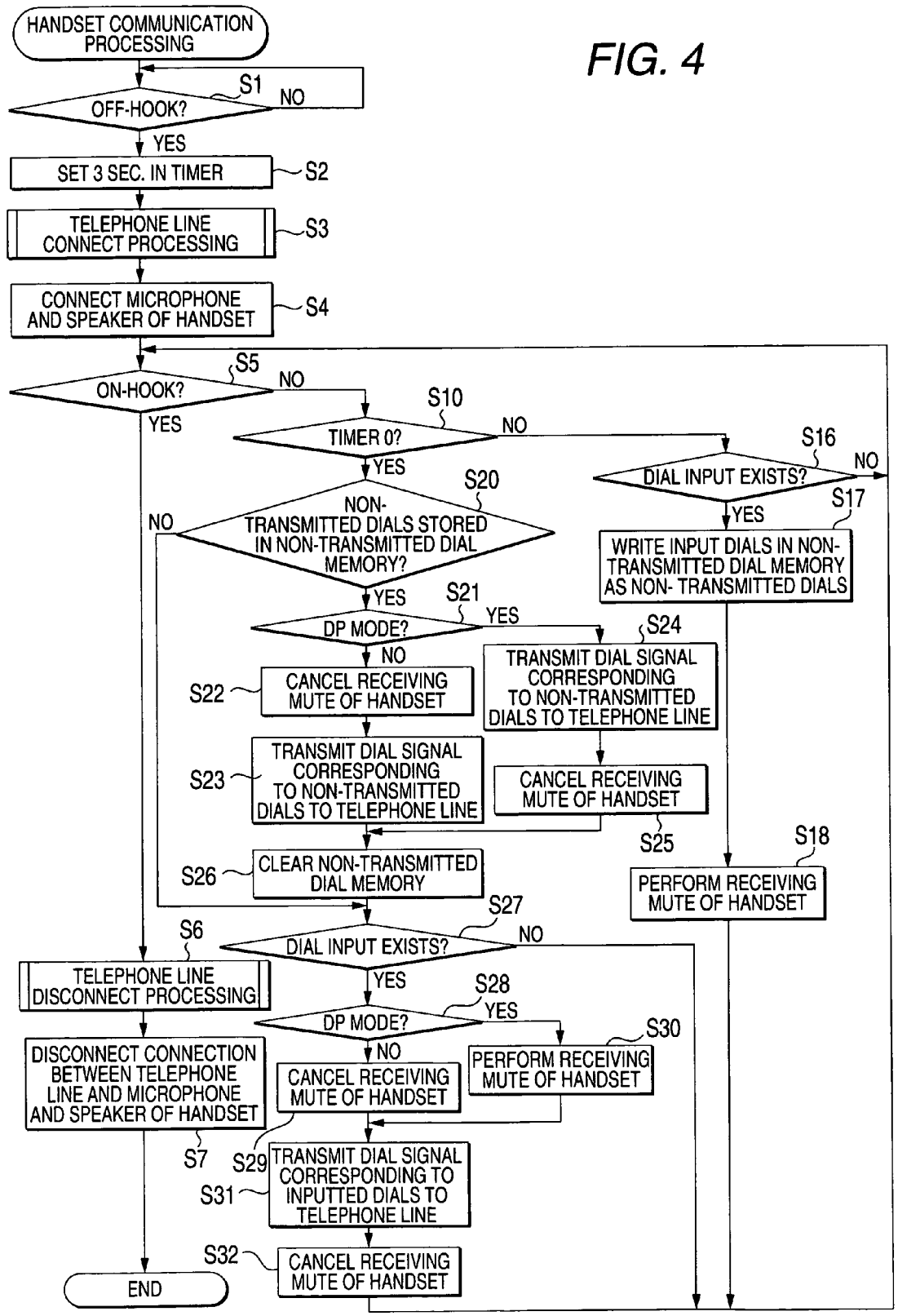
FIG. 4 is a flowchart of a handset communication processing executed by a facsimile apparatus according to a second aspect of the present invention.

FIG. 4 is a flowchart showing the handset communication processing of the second aspect. The handset communication processing of the second aspect performs a communication by using the handset 3 similarly to the first aspect. For the predetermined time period from a time when the operator performs the off-hook state of the handset 3, the standby operation for waiting for a transmission of dial signals to the telephone line 31 is executed even when the dial is inputted. Further, the receiving mute of the handset 3 and cancellation thereof are appropriately executed with timings of the dial input and the dial signal transmission in the handset communication processing of the second aspect.

The handset communication processing of the second aspect (S1 to S7) includes starting the measuring by the timer 11a when an off-hook state is detected, executing the connection of the telephone line 31, and disconnecting the telephone line when an on-hook state is detected. During a time in which the measuring by the timer 11a is in progress, that is, the predetermined time in which the transmission of the dial signal is to be suspended (S10:No), it is confirmed whether or not there is a dial input (S16). When there is the dial input (S16:Yes), the inputted dial signals are written in the non-transmitted dial memory 14a as non-transmitted dial (S17), and the mute function of the mute circuit is turned on to perform the receiving mute of the handset 3 (S18). The various signals received through the telephone line 31 are outputted to the speaker 35b through the mute circuit as mentioned above. Therefore, when the dial tone is received from the exchange 29, the signal sound of the dial tone from the speaker 35b is muted.

The dial tone is transmitted from the exchange 29 in response to a calling from a communication apparatus, such as a facsimile apparatus or a telephone set, and the transmission thereof is stopped when the exchange 29 receives dial signals from the calling communication apparatus. In the conventional facsimile apparatus, dial signals are transmitted to a telephone line immediately when the operator performs the dial input. Therefore, the dial tone outputted from the facsimile apparatus is muted in response to the dial input and the operator usually understands the mute of the dial tone as an execution of the dial input.

However, in the facsimile apparatus 1, the dial signals are not transmitted during the measuring of the predetermined time (3 seconds) by the timer 11a. Therefore, even when the dial input is executed during the measuring by the timer 11a, the dial tone is continuously transmitted from the exchange 29. When the dial tone is outputted from the speaker 35b regardless of the dial input, the operator may become uncomfortable; or, depending upon the situation, the operator might regard the dial tone as an incorrect dial input and might retry the dial input.

In the second aspect, during the measuring of 3 seconds by the timer 11a, that is, during the time period in which the transmission of the dial signal is suspended, the receiving side mute is performed in response to the dial input to mute the dial tone. That is, when the dial input is executed, a state similar to that when the transmission of dial tone is stopped is created imitatively. With the mute of the dial tone in response to the dial input, the operator can be noticed that the dial input is correctly executed. Therefore, it is possible to avoid the uncomfortable feeling of the operator and the redialing.

After the step S18, the processing is shifted to the step S5. When, in the step S16, there is no dial input (S16:No), the processing of the step S5 is executed.

Further, when, in the step S10, the measuring by the timer 11a ends (S10:Yes), the period (3 seconds from the detection of the off-hook), for which the transmission of the dial signal is suspended, lapses. Then, it is confirmed whether or not non-transmitted dial is stored in the non-transmitted dial memory 14a (S20). When non-transmitted dial is not stored in the non-transmitted dial memory 14a (S20:No), the processing is shifted to the step S27 by skipping the steps S21 to S26.

When non-transmitted dial signals are stored in the non-transmitted dial memory 14a (S20:Yes), it is confirmed whether or not the mode set by the mode switch 4a is the DP mode (S21). When the mode is not the DP mode (S21:No), the mode is the DTMF mode. Therefore, the mute function of the mute circuit is turned off to cancel the receiving mute (S22), and then the non-transmitted dial signals stored in the non-transmitted dial memory 14a are transmitted to the telephone line 31 (S23). Since sound of the transmitted dial signal (DTMF signal) is outputted from the speaker 35b, the transmission of the dial signals is clearly notified to the operator, so that the operator is not concerned by fear that the transmission of the dial signals is not performed correctly.

On the other hand, when the mode set by the mode switch 4a is the DP mode (S21:Yes), the non-transmitted dial signals stored in the non-transmitted dial memory 14a are transmitted to the telephone line 31 (S24), and then the mute function of the mute circuit is made off to cancel the receiving mute (S25).

In general, the level of the dial pulse signal is high compared with the DTMF signal. Therefore, if the dial pulse signals generated corresponding to the inputted dial are outputted from the speaker 35b as it is, the signal sound becomes too much and the operator may become uncomfortable. In the second aspect, before the transmission of the dial signal, the mode is checked. When the mode is the DP mode, the receiving mute is executed to avoid the output of uncomfortable sound of the large dial pulse signal from the speaker 35b.

After the processing in the step S23 or S25, the processing in the step S26 is executed. In the step S26, the non-transmitted dial memory 14a is cleared, and then it is confirmed whether or not the dial input is performed (S27). When there is no dial input (S27:No), the processing is shifted to the step S5. On the other hand, when there is the dial input (S27:Yes), it is confirmed whether or not the mode is the DP mode (S28). When it is not the DP mode (S28:No), the mute function of the mute circuit is turned off to cancel the receiving mute of the handset 3 (S29). When it is the DP mode (S28:Yes), the mute function of the mute circuit is made on to perform the receiving mute of the handset 3 (S30), and the dial signals corresponding to the inputted dial are transmitted to the telephone line 31 (S31). Then, the mute function of the mute circuit is made off to cancel the receiving mute of the handset 3 (S32), and the processing shifts to the step S5.

Incidentally, in the handset communication processing of the second aspect, the muting of the dial tone is to notify the operator of the dial input. Therefore, it may be enough to not mute but reduce volume of sound outputted from the speaker 35b compared with volume before the dial input. In such case, the mute circuit is set such that the level of the dial tone outputted from the mute circuit is lowered to a level lower than the input level, and the output level becomes higher than the mute level. In such case, when the receiving mute is executed by the processing in the steps S18 and S30, the signal sound of the dial tone from the speaker 35b is outputted in a level lower than that before the dial input (before the receiving mute). Incidentally, when the mute circuit is set such that the output signal level is lower than the input signal level, the handset communication processing in the step S18 functions as a level lowering unit.

Further, the mute level of the dial tone may be different from the mute level of the dial pulse signal. As to the dial tone, the mute level may be set to a silence level, and the mute level for the dial pulse signal may be set to, not a silence level, but an audible sound volume at which is not uncomfortable.

When the speakerphone communication is executed by pressing the speakerphone key 35d, a microphone (not shown) and the speaker 28 are connected to the telephone line 31 instead of the microphone 35a and the speaker 35b of the handset 3 and the transmission of the dial signals is executed similarly to the handset communication processing. Further, the output of signal sound from the speaker 28 and the receiving mute are executed in a pattern similar to the output pattern from the speaker 35b of the handset 3.

Figure 5:
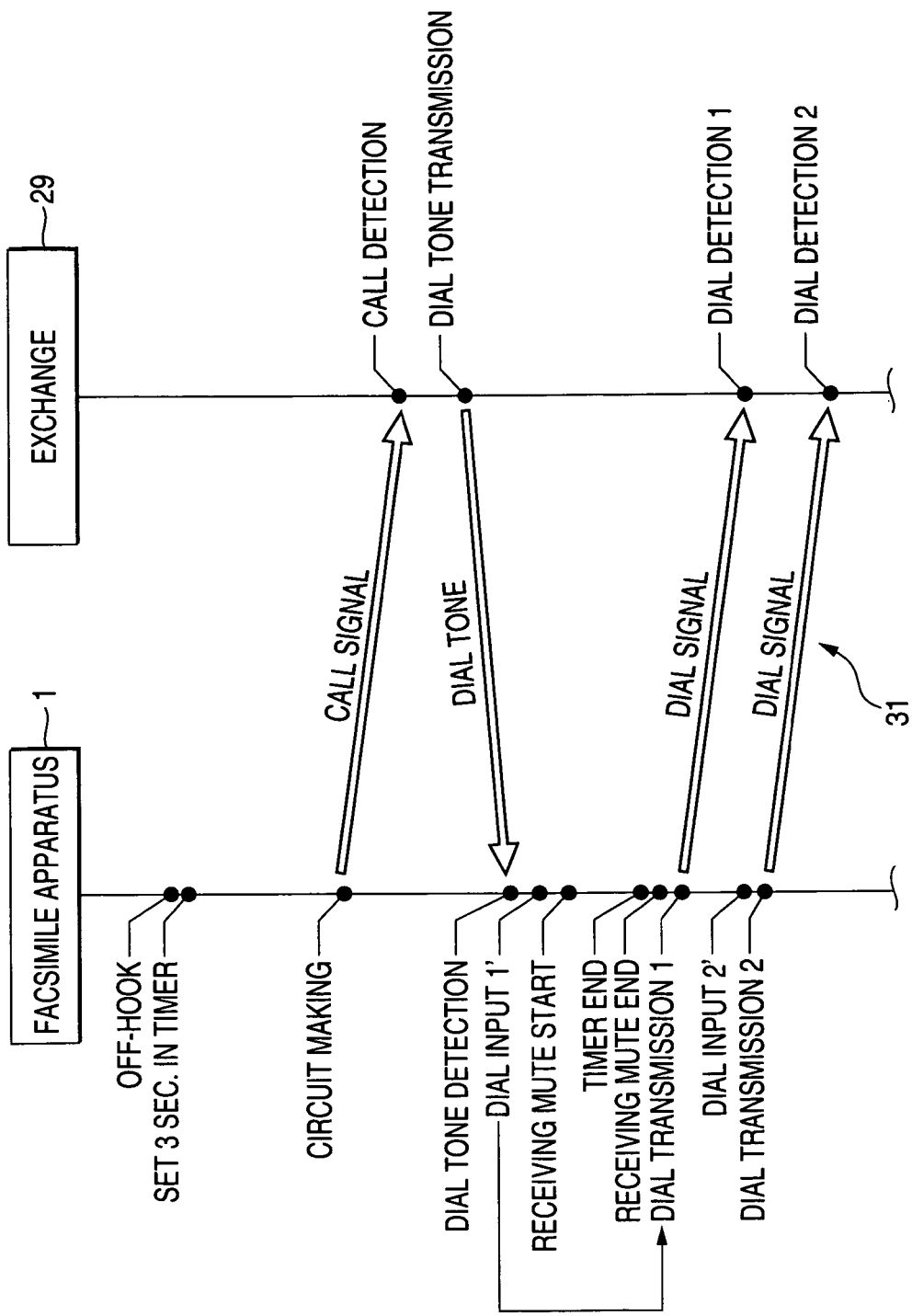
FIG. 5 is a timing chart showing transmission/reception timings of various signals between the facsimile apparatus according to the second aspect and a repeating installation.

FIG. 5 is a timing chart showing transmitting/receiving timings of the communication of various signals between the facsimile apparatus 1 of the second aspect and the exchange 29 in executing the handset communication processing shown in FIG. 4. The timing chart shown in FIG. 5 shows a case where the dial signals are transmitted to the telephone line 31 in the DTMF mode. Two vertical lines are time axes, a left side line of which shows the operations in the facsimile apparatus 1 in time series and a right side line of which shows the operations in the exchange 29 in time series. Timings of the respective operations performed in the facsimile apparatus 1 and the exchange 29 are indicated by black points on the time axes.

In the facsimile apparatus 1, the line connect operation in the SDAA 33 is started by executing the off-hook state of the handset 3 (off-hook) and starting the measuring by the timer 11a (timer set of 3 seconds) with timing similar to the timing of the first aspect shown in FIG. 3. When the telephone line is connected ("DC loop made"), a call signal is transmitted to the exchange 29 ("line made").

On the other hand, in the exchange 29, when a call signal is detected ("call detection") similarly to the first aspect, a preparation for receiving dial signals from the facsimile apparatus 1 is started. When the receiving of the dial signals from the facsimile apparatus 1 becomes possible by completing the preparation, a dial tone is transmitted from the exchange 29 ("dial tone transmission").

When the reception of the dial tone is detected in the facsimile apparatus 1 ("dial tone detection"), a signal sound (continuous sound with predetermined pitch) of the dial tone is outputted from the speaker 35b of the handset 3. When, in the facsimile apparatus 1, the dial input is performed before the measuring of 3 seconds by the timer 11a is ended ("dial input 1"), the receiving mute is immediately executed ("receiving mute start"). The dial tone is continuously transmitted from the exchange 29 until the exchange 29 receives the dial signals from the facsimile apparatus 1. However, by this receiving mute, the signal sound of the dial tone from the speaker 35b of the handset 3 is muted. Thereafter, when the measuring of 3 seconds by the timer 11a ends in the facsimile apparatus 1 ("timer end"), the receiving mute ends ("receiving mute end") and the dial signals corresponding to the inputted dial ("dial input 1'") are immediately transmitted to the telephone line 31 ("dial transmission 1'"). Further, when the dial is inputted after the end of the measuring by the timer 11a ("dial input 2'"), the corresponding dial signals are transmitted to the telephone line 31 ("dial transmission 2'"). Since the transmission of the dial signals is performed after the receiving mute is cancelled, a signal sound of the DTMF signal is outputted from the speaker 35b to notify the operator of the transmission of the dial signals.

Since the dial signals are receivable by the exchange 29 after the dial tone is transmitted, the dial signals from the facsimile apparatus 1 are received by the exchange 29. When the exchange 29 receives an initial dial signal from the facsimile apparatus 1 ("dial detection 1"), the transmission of dial tone stops. Thereafter, the dial signals transmitted from the facsimile apparatus 1 are received by the exchange 29 sequentially ("dial detection 2").

Incidentally, in the facsimile apparatus 1 of the second aspect, it is determined, prior to the transmission of the dial signal (prior to "dial transmission 1" and prior to "dial transmission 2"), whether the dial signals to be transmitted is the dial pulse signal or the DTMF signal and the receiving mute is executed on the basis of the decision, as mentioned. Since, in FIG. 5, the dial signals to be transmitted is the DTMF signal, the dial signals are transmitted under condition that the receiving mute is cancelled. Incidentally, when the dial signals to be transmitted are the dial pulse signals, the receiving mute is executed again before the transmission of the dial pulse signal and, when the transmission of the dial pulse signal is ended, the receiving mute is cancelled.

As described, according to the facsimile apparatus 1 of the second aspect, it is possible to reliably receive the dial signals corresponding to the inputted dial by the exchange 29 even when the dial input is executed by the operator before the receipt of the dial tone. Further, during the standby period of transmission of the dial signals, it is possible to mute the dial tone by the receiving mute when the dial is inputted to thereby notify the operator of the correct execution of the dial input. Further, the canceling timing of the receiving mute is made different between the case where the dial signals to be transmitted are the DTMF signal and the case where the dial signals are the dial pulse signal. Therefore, in transmitting the dial signals, it is possible to generate the signal sound in appropriate level corresponding to the kind of the dial signal.

Though the aspects of the present invention have been described, the preset invention is not limited to them and can be modified in various manners within the scope of the present invention.

For example, in each of the described aspects, the communication apparatus is constructed with the facsimile apparatus 1. However, the communication apparatus may be constructed with a telephone set having no facsimile function. Further, although the repeating installation is constructed with the exchange 29, the repeating installation may be constructed with a call control server when the connection device is constructed with an IP telephone.

In the second aspect, when the dial input is made during the period (during the measuring of the predetermined time by the timer 11a) for which the transmission of the dial signal is suspended, the mute function of the mute circuit is made on in response to the dial input to mute (level lowering) the signal sound of the dial tone to thereby notify the operator of the dial input execution. However, it is possible to notify the operator of the execution of the dial input by changing the state of the dial tone in response to the dial input. The change of the state may be realized by, for example, changing the pitch of the inputted dial tone by frequency modulating the inputted dial tone or outputting the dial tone, which is a continuous signal, intermittently. In such case, since the dial tone is silenced by the transmission of the dial signals, it is possible to notify the operator of the execution of dial input and the execution of dial transmission, separately.

As was described, in the communication apparatus according to the above-described aspects of the present invention, after the measuring of the predetermined time by the measuring unit ends, the dial signal transmitting unit transmits the dial signal corresponding to a number in response to the input of the telephone number by the number input unit.

Since the dial signals corresponding to the number are transmitted to the telephone line by the dial signal transmission unit when the number is inputted by the number input unit after the measuring of the predetermined time by the measuring unit ends, it is possible to efficiently transmit the dial signals to the line loop without dropping of significant digits and without useless standby. For example, the predetermined time can be set on the basis of a time period from a time when the detection of the operation of the operation unit is detected by the operation detection unit to a time when the connection of the line loop is completed by the line connection unit to a response time period at which the repeating installation becomes possible to receive an information in response to a calling. In such case, after a predetermined time lapses, the telephone line is connected and the repeating installation is in the state capable of receiving the information from the communication apparatus (the state in which the communication between the communication apparatus and the repeating installation is established). In other words, after the measuring of the predetermined time ends, the transmission of the dial signals from the communication apparatus is possible and the repeating installation can receive the dial signals from the communication apparatus. Therefore, after the measuring of the predetermined time ends, it is possible to remove useless standby, to reduce the time required for the dial signal transmission and to transmit the dial signals to the line loop efficiently by transmitting the dial signals corresponding to the number when the number is inputted by the number input unit.

Also, the communication apparatus includes: a sound output unit capable of outputting a sound signal transmitted/received through the line as monitoring sound; an output execution unit capable of being connected to the sound output unit and the line, for outputting the sound signal transmitted/received through the line as sound from the sound output unit; a level setting unit that sets a level of the signal outputted to the sound output unit by the output execution unit; a receiving unit that receives a response signal transmitted from the repeating installation through the line in response to a call by the line connection unit until the repeating installation receives the dial signal transmitted by the dial signal transmitting unit; and a level lowering unit that causes, when the telephone number is inputted by the number input unit before the measuring of the predetermined time by the measuring unit ends, the level setting unit to set a level of the response signal, received by the receiving unit and outputted from the sound output unit through the output execution unit, to be lower than a case where the telephone number is not inputted before the measuring of the predetermined time by the measuring unit ends.

Therefore, when the number input is executed by the number input unit before the measuring of the predetermined time by the measuring unit ends, sound volume of the signal outputted from the sound output unit is lowered by the level lowering unit, compared with that before the number input. By this change of sound volume, the operator is noticed of the execution of the number input by the number input unit is notified.

Since the signal transmitted/received through the line loop is outputted as sound from the sound output unit by the output execution unit, by which the telephone line and the sound output unit are connectable, the response signal received by the receiving unit is outputted from the sound output unit by the output execution unit. The level of the signal outputted to the sound output unit by the output execution unit is set by the level setting unit. When the number input is performed by the number input unit before the measuring of the predetermined time by the measuring unit ends, the level setting unit is operated by the level lowering unit such that the level of the response signal outputted from the sound output unit becomes low compared with when the number input is not performed. Therefore, when the number input is executed by the operator before the measuring of the predetermined time by the measuring unit ends, it is possible to change the level of the response signal outputted from the sound output unit, that is, to change sound volume at a time of the input of the number, by the operation of the level lowering unit (processing within the communication apparatus), even when the response signal is continuously received.

The response signal is transmitted from the repeating installation and the transmission of the response signal is stopped in response to the reception of the dial signals in the repeating installation. Therefore, when the dial signals are transmitted immediately after the number input is performed by the number input unit, the output of the response signal from the sound output unit is stopped in response to the number input. In other words, when the number input is executed, the response signal from the sound output unit is changed by the operation of the repeating installation.

On the other hand, since the transmission of the dial signals corresponding to the number is suspended until the measuring of the predetermined time ends even when the number input is executed, the transmission of the response signal from the repeating installation is not stopped and is continuously received by the receiving unit. In this case, there is no change of the response signal. Therefore, the operator who did the number input may be confused when the response signal is outputted from the sound output unit as it is. In the present communication apparatus, however, it is possible to output the response signal in a level changed in response to the number input (level of the response signal is lowered) in response to the execution of the number input until the end of the measuring of the predetermined time. Therefore, it is possible to eliminate such confusion of the operator.

Therefore, the operator can recognize the execution of number input by the change of the level (level lowering, that is, reduced sound volume) of the response signal outputted from the sound output unit even until the end of the measuring of the predetermined time. Therefore, it is possible to avoid the problem that the operator cannot determine whether or not he inputted the number appropriately and retries the number input. As a result, it is possible to correctly input the number indicating the called apparatus to thereby call the called apparatus exactly.

Also, the communication apparatus further includes: a sound output unit capable of outputting a sound signal transmitted/received through the line as monitoring sound; an output execution unit capable of being connected to the sound output unit and the line, for outputting the sound signal transmitted/received through the line as the monitoring sound from the sound output unit; a level setting unit that sets a level of the signal outputted to the sound output unit by the output execution unit; a receiving unit that receives a response signal transmitted from the repeating installation through the line in response to a call by the line connection unit until the repeating installation receives the dial signal transmitted by the dial signal transmitting unit; and a level-off unit that causes, when the telephone number is inputted by the number input unit before the measuring of the predetermined time by the measuring unit ends, the level setting unit to mute the response signal received by the receiving unit and outputted from the sound output unit through the output execution unit.

Therefore, when the number input is executed by the number input unit before the measuring of the predetermined time by the measuring unit ends, the signal outputted by the sound output unit is muted by the level-off unit. By this change (silence) of sound volume, the execution of the number input by the number input unit is noticed.

Incidentally, the level-off unit may cause the level setting unit to operate such that the signal level set by the level setting unit becomes a level lower than a audible limit level or may cause the level setting unit to operate such that the signal output itself is stopped by cutting the connection to the sound output unit.

The signal transmitted/received through the line loop is outputted from the sound output unit as sound by the output execution unit capable of connecting between the sound output unit and the telephone line. The response signal received by the receiving unit is also outputted from the sound output unit by the output execution unit. Level of the signal outputted to the sound output unit by the output execution unit is set by the level setting unit. When the number input is made by the number input unit before the measuring of the predetermined time ends, the level setting unit is operated by the level-off unit at the time in response to the number input such that the response signal outputted from the sound output unit is muted. Therefore, when the number input is executed by the operator before the measuring of the predetermined time ends, it is possible to mute the response signal outputted from the sound output unit in response to the number input by the operation (processing within the communication apparatus) of the level-off unit even in a case where the response signal is continuously received.

The response signal is transmitted from the repeating installation and the transmission of the response signal is stopped in response to the receipt of the dial signals by the repeating installation. Therefore, when the dial signals are transmitted immediately after the number is inputted by the number input unit, the output of the response signal from the sound output unit is stopped in response to the number input. In other words, the response signal outputted from the sound output unit is muted by the operation of the repeating installation at the time when the number input is executed.

On the other hand, since the transmission of the dial signals corresponding to the telephone number is suspended until the measuring of the predetermined time ends even when the number input is executed, the transmission of the response signal from the repeating installation is not stopped and the response signal is continuously received by the receiving unit. In this case, since there is no level change of the response signal received, the operator who inputs the number may be confused if the response signal is outputted from the sound output unit as it is. However, in the present communication apparatus, when the number input is executed until the measuring of the predetermined time is end, it is possible to mute the response signal at a time when the number is inputted to thereby eliminate such confusion of the operator.

Therefore, the operator can recognize the execution of the number input by muting the response signal from the sound output unit before the measuring of the predetermined time ends. Therefore, it is possible to eliminate the situation where the operator cannot clearly determine whether or not he inputted the number and retries the number input. As a result, it is possible to execute the input of the number indicating the called apparatus correctly to thereby call the called apparatus exactly.

Further, in a related art communication apparatus in which dial signals are transmitted to a telephone line immediately after a number input, the number input is usually notified by muting a response signal. Therefore, in the present communication apparatus, it is possible to easily notify the operator of the execution of the number input without giving an uncomfortable feeling to the operator by notifying the number input by muting the response signal even in a state where the transmission of the dial signals are suspended.

Also, the communication apparatus further includes a recovery unit that recovers the level setting unit by canceling the operation of the level setting unit executed by the level lowering unit when the measuring of the predetermined time by the measuring unit ends, wherein, when the dial signal transmitted to the line by the dial signal transmitting unit is outputted to the sound output unit by the output execution unit, the dial signal is outputted from the sound output unit in a level recovered by the recovery unit.

That is, it is possible to recover the state of the level setting unit to the state before the operation by the level lowering unit or the level-off unit by canceling the operation of the level setting unit, which is executed by the level lowering unit or the level-off unit by the recovery unit, by the recovery unit when the measuring of the predetermined time by the measuring unit ends. As a result, when the dial signals transmitted from the dial signal transmission unit to the telephone line are outputted to the sound output unit by the output execution unit, it is possible to output it from the sound output unit in the level recovered by the recovery unit. Therefore, it is possible to output the sound of the dial signals transmitted from the dial signal transmission unit from the sound output unit with sound volume large enough to be heard by the operator, to thereby clearly notify the operator of the transmission of the dial signals.

In addition, the communication apparatus further includes a recovery unit that recovers the level setting unit by canceling the operation of the level setting unit executed by the level-off unit when the measuring of the predetermined time by the measuring unit ends, wherein, when the dial signal transmitted to the line by the dial signal transmitting unit is outputted to the sound output unit by the output execution unit, the dial signal is outputted from the sound output unit in a level recovered by the recovery unit.

That is, when the dial signals transmitted to the line loop by the dial signal transmission unit is determined as dial pulse signals, it is possible to set the level of the dial signals to the level in which the dial signals are muted or to a level lower than the original level, by operation of the level setting unit by the dial pulse level setting unit before the dial signal transmission unit transmits the dial signals to the telephone line. Since, when the dial signals transmitted to the telephone line are the dial pulse signals, it is muted or outputted by the sound output unit in the level lower than the original level, the dial pulse signal having a level, which is generally high compared with the level of a DTMF signal, is not outputted from the sound output unit as it is. Therefore, the dial pulse signal, which is louder compared with the DTMF signal, is not outputted from the sound output unit. Consequently, the dial pulse signal in a level, which is uncomfortably high compared with the DTMF signal, is not outputted from the sound output unit.

Incidentally, when the dial signals are determined by the judge unit as dial pulse signals, the dial pulse level setting unit may keep the level of the dial pulse signals in low level or the mute level by continuing the operation of the level lowering unit or the level-off unit or may lower the level of the dial pulse signals or make it in the mute level again, after the operation of the level lowering unit or the level-off unit is cancelled.

What is claimed is:

1. A communication apparatus comprising:
   an operation unit for connecting a line by an operation of an operator;
   a line connection unit that calls a repeating installation by connecting the line in response to the operation of the operation unit;
   a number input unit for inputting a telephone number designating a called apparatus according to an operation of the operator;
   a dial signal transmitting unit that transmits a dial signal corresponding to the telephone number inputted by the number input unit to the line connected by the line connection unit;
   an operation detection unit that detects the operation of the operation unit;
   a measuring unit that measures a predetermined time when the operation of the operating unit is detected by the operation detection unit; and
   a number memory that stores the telephone number inputted by the number input unit before the measuring of the predetermined time by the measuring unit ends,
   wherein the dial signal transmitting unit comprises a standby unit that suspends a transmission of the dial signal corresponding to the telephone number stored in the number memory to the line until the measuring of the predetermined time by the measuring unit ends, and
   the dial signal transmitting unit transmits the dial signal corresponding to the telephone number and stored in the number memory to the line after a standby operation by the standby unit.

2. The communication apparatus according to claim 1, wherein, after the measuring of the predetermined time by the measuring unit ends, the dial signal transmitting unit transmits the dial signal corresponding to a number in response to the input of the telephone number by the number input unit.

3. The communication apparatus according to claim 1, further comprising:
   a sound output unit capable of outputting a sound signal transmitted/received through the line as monitoring sound;
   an output execution unit capable of being connected to the sound output unit and the line, for outputting the sound signal transmitted/received through the line as sound from the sound output unit;
   a level setting unit that sets a level of the signal outputted to the sound output unit by the output execution unit;
   a receiving unit that receives a response signal transmitted from the repeating installation through the line in response to a call by the line connection unit until the repeating installation receives the dial signal transmitted by the dial signal transmitting unit; and
   a level lowering unit that causes, when the telephone number is inputted by the number input unit before the measuring of the predetermined time by the measuring unit ends, the level setting unit to set a level of the response signal, received by the receiving unit and outputted from the sound output unit through the output execution unit, to be lower than a case where the telephone number is not inputted before the measuring of the predetermined time by the measuring unit ends.

4. The communication apparatus according to claim 1, further comprising:
   a sound output unit capable of outputting a sound signal transmitted/received through the line as monitoring sound;
   an output execution unit capable of being connected to the sound output unit and the line, for outputting the sound signal transmitted/received through the line as the monitoring sound from the sound output unit;
   a level setting unit that sets a level of the signal outputted to the sound output unit by the output execution unit;
   a receiving unit that receives a response signal transmitted from the repeating installation through the line in response to a call by the line connection unit until the repeating installation receives the dial signal transmitted by the dial signal transmitting unit; and
   a level-off unit that causes, when the telephone number is inputted by the number input unit before the measuring of the predetermined time by the measuring unit ends, the level setting unit to mute the response signal received by the receiving unit and outputted from the sound output unit through the output execution unit.

5. The communication apparatus according to claim 3, further comprising a recovery unit that recovers the level setting unit by canceling the operation of the level setting unit executed by the level lowering unit when the measuring of the predetermined time by the measuring unit ends,
   wherein, when the dial signal transmitted to the line by the dial signal transmitting unit is outputted to the sound output unit by the output execution unit, the dial signal is outputted from the sound output unit in a level recovered by the recovery unit.

6. The communication apparatus according to claim 4, further comprising a recovery unit that recovers the level setting unit by canceling the operation of the level setting unit executed by the level-off unit when the measuring of the predetermined time by the measuring unit ends,
   wherein, when the dial signal transmitted to the line by the dial signal transmitting unit is outputted to the sound output unit by the output execution unit, the dial signal is outputted from the sound output unit in a level recovered by the recovery unit.

7. The communication apparatus according to claim 3, further comprising:
   a determination unit that determines whether or not the dial signal transmitted to the line by the dial signal transmitting unit is a dial pulse signal; and
   a dial pulse level setting unit that causes, when the dial signal is determined by the determination unit as the dial pulse signal, the level setting unit to set the level of the dial signal to a level lower than an original level before the dial signal is transmitted to the line by the dial signal transmitting unit.

8. The communication apparatus according to claim 4, further comprising:
   a determination unit that determines whether or not the dial signal transmitted to the line by the dial signal transmitting unit is a dial pulse signal; and
   a dial pulse level setting unit that causes, when the dial signal is determined by the determination unit as the dial pulse signal, the level setting unit to set the level of the dial signal to a level lower than an original level before the dial signal is transmitted to the line by the dial signal transmitting unit.

* * * * *